United States Patent [19]
Lindemuth et al.

[11] 3,860,520
[45] Jan. 14, 1975

[54] ODOR REDUCTION IN ALCOHOLS

[75] Inventors: Laurence D. Lindemuth, Morris, Ill.;
Donald K. Whitehead, Lake Charles; Chester Fronczek, Westlake, both of La.

[73] Assignee: Continental Oil Company, Ponca City, Okla.

[22] Filed: Aug. 19, 1968

[21] Appl. No.: 753,767

Related U.S. Application Data

[63] Continuation-in-part of Ser. No. 662,196, Aug. 22, 1967, , which is a continuation of Ser. No. 435,049, Feb. 24, 1965, abandoned.

[52] U.S. Cl. ............... 260/643 F, 203/29, 203/34, 260/454, 260/458
[51] Int. Cl. .......................................... C07c 29/24
[58] Field of Search ............. 260/454, 643, 643 F; 203/29, 34

[56] References Cited
UNITED STATES PATENTS

| | | | |
|---|---|---|---|
| 2,957,023 | 10/1960 | Dimler et al. | 260/643 F |
| 3,290,396 | 12/1966 | Starks et al. | 260/643 F |
| 3,449,446 | 6/1969 | Higgins | 260/459 X |
| 3,542,652 | 11/1970 | Williams et al. | 260/643 F |

*Primary Examiner*—Leon Zitver
*Assistant Examiner*—A. Siegel
*Attorney, Agent, or Firm*—Bayless E. Rutherford, Jr.; Robert B. Coleman, Jr.; A. Joe Reinert

[57] ABSTRACT

Alkanols of 12 to 30 carbon atoms containing alkanediols as the principal odor precursor for use in preparation of detergents by sulfation are treated with 100 to 500 ppm of an alkali borohydride for at least one hour at a temperature of at least 500°F. prior to sulfation to improve the odor of the resulting sulfate.

10 Claims, No Drawings

ODOR REDUCTION IN ALCOHOLS

This is a continuation-in-part of our earlier filed application Ser. No. 662,196, filed Aug. 22, 1967, which in turn was a continuation of Ser. No. 435,049, filed Feb. 24, 1965, now abandoned.

This invention relates to high molecular weight aliphatic alcohols. In one of its aspects it relates to ALFOL alcohols. In another aspect, this invention relates to preparation of an alcohol for sulfation.

High molecular weight aliphatic alcohols 1-alkanols of 6 to 24 or more (e.g. 30) carbon atoms are rapidly becoming more and more important as detergent intermediates especially since detergents prepared from such 1-alkanols are more biodegradable than are the detergents prepared using aryl type bases. Such detergents are prepared by sulfating the alcohol or the alcohol ethoxylate and subsequently neutralizing the product.

It has been found that when ALFOL type alkanols are sulfated with a sulfating agent such as chlorosulfonic acid and subsequently neutralized with a base, such as sodium hydroxide, an odor is produced. The odor is most pronounced in the dodecanol alcohol, however, detectable to some extent in all detergent range alcohols $C_{12}$ through $C_{18}$.

This odor is believed to be produced by the formation of cyclic compounds from trace amounts of dihydroxyl components present in the alcohols i.e., alkanediol odor precursors. For example, the octanediol present in the dodecanol is believed to be the precursor to the odor of the sodium dodecyl sulfate.

It is, therefore, an object of this invention to provide a method of removing diols from aliphatic 1-ols (1-alkanols). It is another object of this invention to provide a method of treating ALFOL alcohols to make them suitable for detergent intermediates. Other objects and advantages of the invention will be obvious from this specification and the claims.

These and other objects of this invention are achieved by contacting aliphatic 1-ols containing minor amounts of diols with an alkaline borohydride and subjecting the resulting mixture to a temperature of at least 500°F.

It has now been found that a substantial reduction in subsequent sulfate odor can be effected by heating the alcohol to be sulfated to a temperature of at least 500°F. in the presence of sodium borohydride.

Since the alcohols obtained by the so-called growth process or ALFOL alcohols usually contain these odor precursors, believed to be diols, this invention will be discussed with relation to such alcohols. However, it should be understood that any alcohol containing diols can be effectively treated by the present invention.

Karl Ziegler has disclosed that high molecular weight alcohols can be prepared by contacting a metal trialkyl with an olefin to produce a metal trialkyl wherein the alkyl radicals contain a greater number of carbon atoms than did the original metal alkyl. For example when aluminum triethyl is contacted with ethylene under growth conditions, an aluminum trialkyl is formed wherein the alkyl radicals each contain a large number of carbon atoms, e.g. 6 to 24 or even more if desired, e.g. 30. This growth product can then be oxidized to form the aluminum trialkoxys and subsequently hydrolyzed in the presence of, for example, sulfuric acid to liberate alcohols of 6 or more carbon atoms and alum. Usually the product will contain a mixture of alcohols having varying carbon atoms.

These alcohols can then be separated, e.g., by fractionation into various fractions having relatively close boiling points and being of close molecular weight, e.g., $C_6$–$C_8$, $C_8$–$C_{10}$, $C_{10}$–$C_{12}$, $C_{12}$–$C_{14}$, etc. Unfortunately, these alcohols also contain minor quantities of isomerization products and diols which are undesirable. Such alcohols are referred to herein as ALFOL alcohols.

For detergent purposes, such alcohols having 12 to 18 carbon atoms are particularly useful. Examples of such alcohols include dodecanol, tetradecanol, hexadecanol and octadecanol.

The alkaline borohydride is preferably employed as the anhydrous borohydride. The preferred borohydride is sodium borohydride, however, other borohydrides can be used. Especially useful are the alkali borohydrides; in addition to sodium borohydride can be mentioned lithium borohydride and potassium borohydride. Also useful are the alkaline earth borohydrides such as calcium borohydride and magnesium borohydride.

The quantity of borohydride added determines to some degree the extent of attendant odor reduction and also the heating time required to effect the reduction. Also the amount of diols present would determine the amount of borohydride required. In general the amount of borohydride used will be in the range 100 ppm to 500 ppm for the ALFOL alcohols.

As has been indicated, the temperature to which the alcohol containing the borohydride is heated will be at least 500°F. and generally will be in the range 500° to 550°F., however, higher temperatures are not objectionable.

The time of contact is important in that sufficient time is utilized to completely react the odor precursors. Benefits are noted when the alcohol is contacted with sodium borohydride at 500°F. for as little as 1 hour. In general 2 to 4 hours will be sufficient for substantially complete effectiveness. In general, it can be said that with higher temperatures, shorter times can be employed. It should be obvious that longer periods can be employed, but generally no further benefit will be obtained.

After treatment, the improved alcohol can be separated from excess borohydride and the resulting borohydride complex by fractional distillation.

To further illustrate the invention, the following example is given.

EXAMPLE I

The alcohol to be treated is charged to a suitable distillation vessel and $NaBH_4$ anhydrous powder added to provide 200 ppm.

The vessel, still pot, is heated to 500°–520°F. at atmospheric pressure and total reflux. The temperature is maintained in this range for 2 hours. The still is then cooled to less than 200°F. and pressure reduced to 5 mm Hg. The treated alcohol is then fractionated to yield a forecut (1 to 3%), a heartcut (88 to 96%) and a bottoms fraction (3 to 9%). The forecut is not necessary to obtain odor free product, but with the ALFOL alcohol is useful to remove any moisture and/or low boiling alcohols.

The resulting heartcut can then be sulfated say with $ClSO_3H$ to obtain essentially odor free product.

EXAMPLE II

Several runs were made according to Example I. The alcohols were ALFOL alcohols containing 12 to 14 or 12 to 16 carbon atoms as indicated. The data are given below:

| ALCOHOL | TREATMENT | ODOR RATING* |
|---------|-----------|--------------|
| 1214 | None | 2.6 |
| 1214 | NaBH$_4$ | 0.9 |
| 1216 | None | 2.6 |
| 1216 | None | 2.8 |
| 1216 | NaBH$_4$ | 1.3 |
| 1216 | NaBH$_4$ | 0.8 |

*The odor ratings are based on a scale of 1 being faint, 2 moderate, 3 being strong. These are rated blind by a group of 5 personnel and giving their opinion of odor. The opinions are then averaged and a rating given.

Having thus described the invention, what is claimed is:

1. In a process for removing an alkanediol odor precursor from a mixture comprising an alkanediol odor precursor and an alkanol having 12 to 30 carbon atoms per molecule, said alkanediol odor precursor being an alkanediol which produces an odoriferous material upon sulfation; the improvement comprising:
   a. contacting said mixture with an alkaline borohydride for a period of at least 1 hour at a temperature in the range of 500°F to the lowest decomposition temperature of the alkanol to form a borohydride-alkanediol complex,
   b. selectively volatilizing the alkanol from the borohydride-alkanediol complex, and
   c. recovering the alkanol.

2. The improvement of claim 1 wherein the borohydride is added in an amount to provide 100–500 ppm in the alkanol.

3. The improvement of claim 2 wherein the temperature is maintained in the range of 500° to 550°F. for a period in the range of 2 to 4 hours.

4. The improvement of claim 3 wherein the borohydride is sodium borohydride.

5. The improvement of claim 3 wherein the borohydride is potassium borohydride.

6. The improvement of claim 3 wherein the borohydride is lithium borohydride.

7. The improvement of claim 3 wherein the borohydride is magnesium borohydride.

8. The improvement of claim 3 wherein the borohydride is calcium borohydride.

9. The improved process of claim 1 wherein the alkanol has 12 to 18 carbon atoms per molecule, wherein the alkanediol odor precursor has 12 to 18 carbon atoms per molecule, and wherein the alkanol is selectively volatilized from the borohydride-alkanediol complex by distillation at a temperature of 256°C to 326°C.

10. In a process for removing an alkanediol odor precursor from a mixture comprising an alkanediol odor precursor and an alkanol having 12 to 30 carbon atoms per molecule, said alkanediol odor precursor being an alkanediol which produces an odoriferous material upon sulfation; said mixture having been prepared by contacting a metal alkyl with an olefin to produce a metal trialkyl growth product wherein the alkyl radicals contain a greater number of carbon atoms than did the original metal alkyl, oxidizing the growth product to form the respective metal trialkoxy, and thence hydrolyzing the metal trialkoxy to produce said mixture comprising an alkanediol odor precursor and an alkanol; the improvement comprising:
   a. contacting said mixture with an alkaline borohydride for a period of at least 1 hour at a temperature in the range of 500°F to the decomposition temperature of the alkanol to form a borohydride-alkanediol complex,
   b. fractionally distilling the alkanol (whichis more volatile) from the borohydride-alkanediol complex, (which is less volatile), and
   c. recovering the alkanol.

* * * * *